I. T. SMITH.
SEWING-MACHINE NEEDLES.
No. 194,479. Patented Aug. 21, 1877.
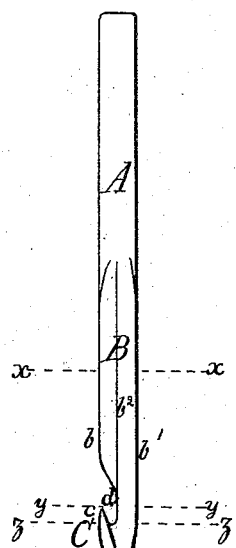
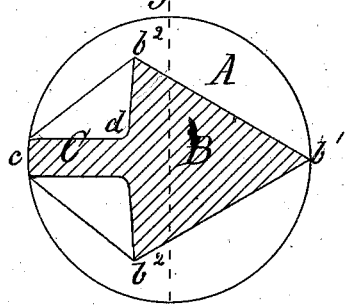
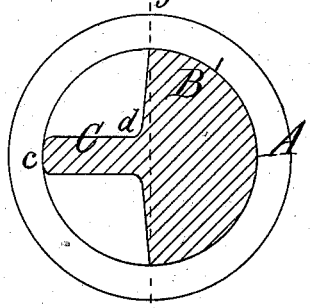
Witnesses:
J. F. Theodore Lang
Russell Barr
Inventor:
Ira T. Smith
Mason Fenwick Lawrence
Attys.

UNITED STATES PATENT OFFICE.

IRA T. SMITH, OF HAMDEN, CONNECTICUT.

IMPROVEMENT IN SEWING-MACHINE NEEDLES.

Specification forming part of Letters Patent No. 194,479, dated August 21, 1877; application filed May 16, 1877.

*To all whom it may concern:*

Be it known that I, IRA T. SMITH, of Hamden, in the county of New Haven and State of Connecticut, have invented a new and useful Improvement in Machine-Needles for Sewing Leather; which improvement is fully set forth in the following specification, and accompanying drawings, in which latter—

Figure 1 is a side elevation of one of my improved needles. Fig. 2 is a front view of the same. Fig. 3 is a cross-section in the line $x\ x$ of Fig. 1. Fig. 4 is a cross-section in the line $y\ y$ of Fig. 1, looking upward. Fig. 5 is an enlarged section in the line $z\ z$ of Fig. 1. Fig. 6 is a similar section of a round needle as ordinarily used. Figs. 7, 8, and 9 are diagrams of stitches made by other needles now in use; and Fig. 10 is a diagram of the stitches made by my improved needle.

The nature of my invention consists in so shaping the needle-body from the usual cylindrical blank that the usual proportions of the hook or front part of the needle are maintained, but the back of the needle is strengthened by means of greater extension or thickness in the direction in which the stitches are laid.

The object of my invention is to obtain a needle which has the same size of shank and hook for making a certain standard stitch, with a certain standard size of wax-thread, as needles heretofore in use, but which is much stronger at the throat opposite the hook, and makes a hole in the leather which is less liable to misguide the thread when it is being drawn tight, and the leather around said hole more ready to close up around the located thread.

In the drawings, A represents the shank of a needle, B, having a thread-hook, C.

In practice, the shank A is of larger diameter than the needle below. The size of the needle, and consequently that of its shank, varies in proportion to the size of thread used with it.

Taking the well-known round needle for one instance of illustration, I have shown in Fig. 6 an enlarged section through the hook at an altitude answering the line $z\ z$ in Fig. 1 of my needle. I have shown in Fig. 5 a similar section of my needle. The round needle B' is concentric with its shank A', and its hook C is formed by cutting away the metal at both sides up to the diameter, or nearly so, of the needle.

I construct my improved needle by forming a hook on a common blank, making a part of the cylindrical surface of said blank the forward extremity or front $c$ of the hook C. The said hook does not materially differ in its shape and size from the hook used heretofore for the same kind of work; but its front $c$ is moved farther away from the center-line of the blank than the hook in the common needle.

In some needles the shank is always reduced in diameter before the hook and the other parts are made, and hence the part designated $c$ is brought closer to the center-line of the blank than in my needle.

To facilitate the forming of the hook of my improved needle the corresponding part of the blank is shaped prismatic—*i. e.*, with two equal converging planes, which form, with the transverse line $b^2\ b^2$ of the neck $d$ of the hook as a basis, an isosceles triangle with a slightly-rounded apex, $c$. The said transverse line $b^2\ b^2$ or basis invariably crosses the center-line of the blank, or is even placed behind it in needles of the present construction; but in my improved needle it is always in front of the center-line of the blank.

By having the back of the needle terminate at the cylindrical surface of the blank, the distance from the transverse line $b^2\ b^2$ or basis back to the rear part of the blank becomes greater than that from said line to the front of the hook to an extent double the distance of the said transverse line from the center-line of the blank. From the points $b^2\ b^2$ I reduce the blank so that its sectional area becomes an isosceles triangle, having for its basis the said transverse line $b^2\ b^2$, and having its apex $b^1$ in the cylindrical surface of the blank.

From the foregoing it will be seen that I use the full diameter of the original blank for the longest diameter of my needle, and thus secure a stronger sectional area for the neck $d$ of the same than obtained by any other construction of a straight needle from a like blank; or, in other words, I contract the transverse or base line $b^2\ b^2$ of the neck and extend its longitudinal dimension.

The hole made by a round needle is considerably too large for the thread which is used with it, and there is consequently an unsteadiness in the thread when closing on the leather, which causes the stitches to lie unevenly, and the rim of the sole to bilge at intervals along the length of the same, as seen in diagram, Fig. 7. In Fig. 10 I have shown how the acute angles of the holes made by my needle of rhomboidal section serve as central guides to the threads when the stitches are drawn tight, in consequence of which the stitches lie precisely in the desired direction when finished, without bilging the rim of the sole.

The side edges $b^2$ of my improved needle serve to partly sever and partly crowd the leather aside, thereby greatly reducing the friction that needles with cylindrical or flattened sides have to overcome by forcibly wedging the leather apart. The elasticity of the leather around the rhomboidal-shaped hole is much less destroyed than in a round hole, and the leather closes up more readily and perfectly around the thread after the stitch is finished than is the case with the round or nearly rectangular hole.

I make the nose or front $c$ of the hook C slightly flat to prevent premature wear of its extremities, and for the same reason, with reference to the wear caused by the cast-off, used in connection with these needles, I make the front edge $b$ of the needle slightly broader than the hook below; but the said broadened portion is always considerably less than the thickness of the thread used with the needle, in order to preserve the central guidance of the thread between the acutely-inclined sides of the hole.

Fig. 8 represents the faulty direction of stitches, and the consequent bilging of the rim of the sole encountered by the use of a flat-sided needle.

The same will be experienced with the use of a grooved needle, which makes cross-shaped holes with laps pointed toward the center, whereby the loose end of the thread is easily guided sidewise instead of forward.

Both of the last-named needles have the disadvantage of being even weaker than the round needle opposite the hook, and they seldom last as long as a round needle.

The lateral contraction and the longitudinal extension of the rhomboidal sectional shape of my needle are in such proportion to each other that there is sufficient room laterally for the ascending needle, and the loop pulled up by it, while at the final settling of the stitch both threads pass each other and assume their places in the longitudinally opposite corners, thereby filling the hole and causing the lateral corners to almost come together again.

Having described my invention, what I claim as new, and desire to secure by Letters Patent, is—

A machine-needle, constructed substantially as described, consisting of the shank A, perforating portion B, and hook C, the perforating portion being in cross-section in the form substantially of two unequal isosceles triangles joined together at their equal bases, the long diagonal being equal to the diameter of the circular shank A, and the short being less than said diameter, the hook C being formed in that part of the perforating portion B which has in cross-section the form of the smaller triangle, as and for the purpose set forth.

Witness my hand this 11th day of May, A. D. 1877, in the matter of my application for a patent on a sewing-machine needle.

IRA. T. SMITH.

Witnesses:
 J. P. THEODORE LANG,
 JNO. H. COOK.